US006983948B2

(12) United States Patent
Denison

(10) Patent No.: US 6,983,948 B2
(45) Date of Patent: Jan. 10, 2006

(54) HUMAN POWERED DEVICE WITH REMOVABLE FLYWHEEL POWER UNIT

(76) Inventor: Cory Denison, 255 E. Pulteney St., Corning, NY (US) 14830

( * ) Notice: Subject to any disclaimer, the term of this patent is extended or adjusted under 35 U.S.C. 154(b) by 1052 days.

(21) Appl. No.: 09/867,218

(22) Filed: May 29, 2001

(65) Prior Publication Data

US 2002/0178850 A1 Dec. 5, 2002

(51) Int. Cl.
*B62M 1/10* (2006.01)

(52) U.S. Cl. .................................. 280/217; 280/261
(58) Field of Classification Search ................ 280/282, 280/217, 230, 231, 259, 260, 261; 180/165; 74/572, 573 R
See application file for complete search history.

(56) References Cited

U.S. PATENT DOCUMENTS

| | | | | | |
|---|---|---|---|---|---|
| 4,353,569 A | * | 10/1982 | Molina | ...................... | 280/217 |
| 4,445,701 A | * | 5/1984 | Stroud | ...................... | 280/217 |
| 4,456,277 A | * | 6/1984 | Carpenter | ................... | 280/282 |
| 4,532,769 A | * | 8/1985 | Vestermark | .................. | 60/698 |
| 4,712,806 A | * | 12/1987 | Patrin | ........................ | 280/217 |
| 4,768,607 A | * | 9/1988 | Molina | ........................ | 180/165 |
| 4,779,485 A | * | 10/1988 | Dollison et al. | .............. | 74/661 |
| 5,507,512 A | * | 4/1996 | Donoghue | .................. | 280/217 |
| 5,826,897 A | * | 10/1998 | Beard | ...................... | 280/250.1 |
| 6,146,218 A | * | 11/2000 | White | ......................... | 440/30 |
| 6,475,122 B2 | * | 11/2002 | Wu | ............................. | 482/57 |
| 6,551,219 B1 | * | 4/2003 | Brown | ........................ | 482/57 |

* cited by examiner

*Primary Examiner*—Lesley D. Morris
(74) *Attorney, Agent, or Firm*—Brown & Michaels, PC

(57) ABSTRACT

A flywheel power unit that can be inserted into a variety of machines. The standardization of the power unit means that the more expensive gearing, clutch and flywheel components do not have to be duplicated in each human powered machine. Standard bicycle gearing components can be assembled with a modified clutch for a typical motorcycle to create an inexpensive human powered flywheel power unit. As the user pedals, power is stored in the flywheel. The flywheel axle is connected to a transmission transfer gear that turns a transmission input gear for a transmission with multiple gears in a gearing ratio of 10:1 to 0.8:1 (which is typical for a motorcycle transmission.). A transmission input gear and the transmission transfer gear are approximately a 1:1 gearing ratio. A transmission output gear is attached to the transmission that provides power output from the flywheel only when a clutch within the transmission in engaged. The power unit can be inserted into a wheeled vehicle or used as a power source for a variety of tools.

7 Claims, 3 Drawing Sheets

HUMAN POWERED DEVICE WITH REMOVABLE FLYWHEEL POWER UNIT

BACKGROUND OF THE INVENTION

1. Field of the Invention

The invention pertains to the field of human powered devices. More particularly, the invention pertains to a pedal powered device that stores energy in a flywheel power unit.

2. Description of Related Art

The advantages of human powered vehicles are known in the art and numerous patents have been granted for a variety of such devices. The low cost, nonpolluting aspects of these vehicles are the most touted advantages, however, the cost of construction and lack of consumer demand for such vehicles seem to be limiting factors to adoption of the technology.

U.S. Pat. No. 4,456,277 granted to Carpenter teaches a human-powered, front-wheel drive tricycle of a having two steerable front wheels in a multi-triangulated frame with a single trailing rear wheel mounted in an independent swing-arm type suspension. A chain drive system (21+speeds) includes a crank assembly mounted on a prow ahead of the front wheels driving a transfer gear and differential to the split front axle. A power take off (PTO) with a flywheel is shown. Carpenter recognizes that a PTO would be useful to run devices such as generators, log splitters, water pumps, saws, paddy threshers, refrigeration, fans, prime movers, lathes, wet or dry mills, pottery wheels, grain winnowers, elevators, and the like. In operation, the bicycle is supported with its front wheels raised off the ground by means of stands. While Carpenter suggests that the power transfer assembly with the PTO may be used independently as a stationary system for converting human power to light industrial usage, no description how this would be accomplished is provided.

U.S. Pat. No. 6,146,218 granted to White teaches a universal platform for a human powered floatation device. The platform is adapted to interchangeably receive multiple types of propulsion devices, such as a bicycle or ski machine. While this system recognizes the advantages of removable power systems, it does not provide a stored power system for a flywheel power system.

The primary market for human powered devices is probably not a vehicle alternative in an industrialized nation. Commutes are normally too far and cars too prevalent for human powered vehicles to make much of a mark. However, effective use of human power can be a dramatic improvement in the lives of those in non-industrialized nations where a variety of machines are needed, but unlikely to be widely available. However, the prior art fails to provide a low-cost standardized flywheel power system that can be used in a variety of devices. Such a device would add desired utility and versatility to human powered devices.

SUMMARY OF THE INVENTION

The present invention teaches a flywheel power unit that can be inserted into a variety of machines. The standardization of the power unit means that the more expensive gearing, clutch and flywheel components do not have to be duplicated in each human powered machine.

The present invention teaches that standard bicycle gearing components can be assembled with a modified clutch of a typical motorcycle to create an inexpensive human powered flywheel power unit. The pedal powered flywheel power unit includes a power unit frame that allows a user to sit and pedal. The pedal assembly includes pedals that turn an axle mounted to the power unit frame. The axle turns a gear connected to a chain that turns a gear on a transfer axle. The transfer axle is also mounted on the frame and turns as the user pedals. The purpose of the transfer axle is to move the rotational force sideways by providing a gear on the other end of the axle that is connected to a second chain that turns a gear on a flywheel axle. The flywheel axle is mounted to the frame and is connected to the flywheel. As the user pedals, power is stored in the flywheel. The flywheel axle is connected to a transmission transfer gear that turns a transmission input gear for a transmission with multiple gears in a gearing ratio of 10:1 to 0.8:1 (which is typical for a motorcycle transmission.). A transmission input gear and the transmission transfer gear are approximately a 1:1 gearing ratio. A transmission output gear is attached to the transmission that provides power output from the flywheel only when a clutch within the transmission in engaged.

The power unit can be inserted into a wheeled vehicle or used as a power source for a variety of tools. As such, the present invention provides a cost effective, easily constructed and interchangeable flywheel power system.

DETAILED DESCRIPTION OF THE INVENTION

Figure 1:
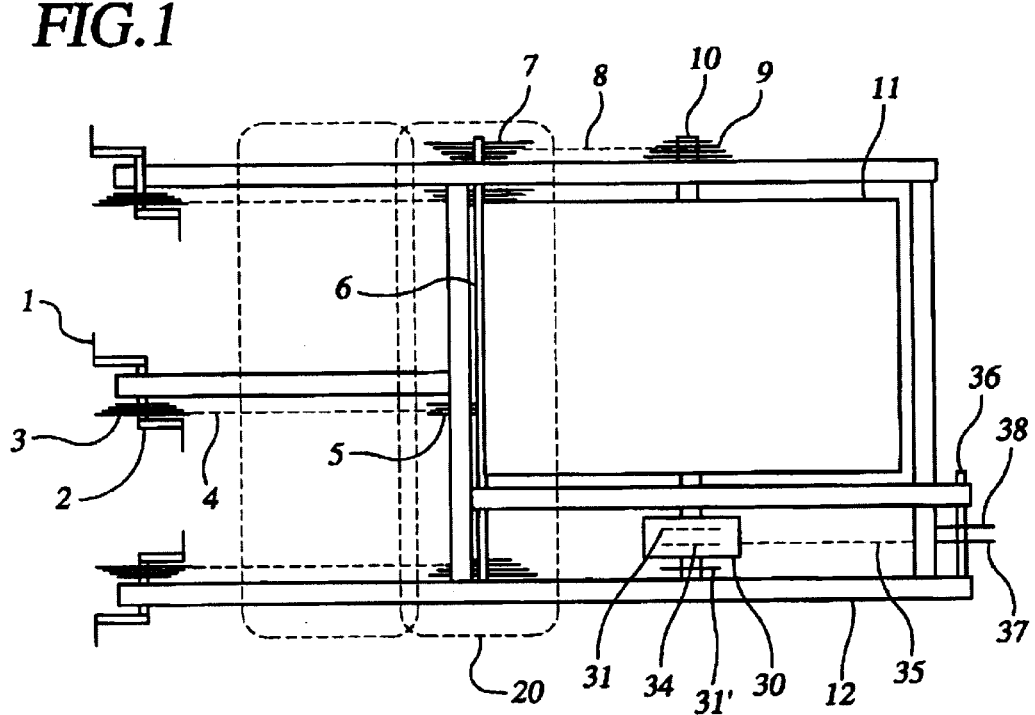
FIG. 1 shows a top view of the removable flywheel power unit of a human powered device of the present invention.

The core of the present invention is the flywheel power unit shown in the figures. In all embodiments, a human provides pedal power to spin a flywheel to store energy for use. In one embodiment the flywheel power unit is used to propel a vehicle. The power unit can be used to power numerous devices, e.g. a generator, power saw, water pump, etc.

One of the critical problems to be solved in creating an interchangeable power system was how to handle the clutching and gearing of the power being delivered from the flywheel. While others have provided customized clutching systems for flywheel powered vehicles, (see U.S. Pat. No. 4,768,607 as an example) this customized approach adds significantly to the cost of the system. The clutch and gearing system is the most highly engineered component in any system and therefore finding a way to adapt currently manufactured components would greatly reduce the cost of the flywheel power system.

Merely, using an existing clutch and transmission system for a combustion engine powered vehicles does not work because the existing system are engineered for a much greater RPM. Specifically, a typical motorcycle clutch uses a gearing ratio on average of 3:1 coming off of the crankshaft of the combustion engine. A typical motorcycle clutch transfers power from the crankshaft on demand through the use of gears to a drive mechanism, (usually chain or belt, however sometimes shaft), which in turn drives the drive wheel. This is achieved when the primary gear, which is attached to the crankshaft, powers a secondary gear which is attached about the perimeter of the clutch basket, whereby the clutch basket retains a number of discs, usually steel, which rotate with and are interlocked to the clutch basket. There are also a number of friction plates centered about a shaft inside the clutch basket alternately between the steel plates, there are typically gears and selectors on or about this shaft away from the clutch basket, when pressure is relieved from this combination a separation of the plates is created allowing the transmission to freewheel and allowing the operator to select an alternate gear or a neutral selection. The creation of the separation is achieved by the use of a hand lever which is attached to a cable which is attached to a fulcrum mechanism which when pressure is applied releases the plates and creates the condition of freewheeling.

The present inventor discovered that a motorcycle clutch and transmission could be modified for use in a flywheel power system by changing a gear on the flywheel axle to transfer power into the clutch at a gearing ratio of 1:1.

The gearing ratio that a human is able to rotate the flywheel should be consistent with their comfort level in front of the flywheel and the requirements of the work to be performed after the flywheel. The key to the invention, is that a modification of the typical ratio of the primary gear (attached to the flywheel) to the secondary gear (attached to the perimeter of the clutch basket) can be adapted for use in a flywheel power unit. For example, with the gearing at 1:1 between the primary and secondary gears, the flywheel could be comfortably spun to 1000 revolutions per minute.

The objective is to utilize the transmission of a typical motorcycle would generally have the gearing of 10:1 for first, 7:1 for second, 5:1 for third, 2:1 for fourth and 0.8:1 for fifth, this would give for the final output of 100 rpm in first, 142 rpm in second, 200 in third, 500 in fourth, and 1250 in fifth. If one wanted greater rpm then one would increase the primary gear. There would be little to no advantage to have the primary gear smaller than the secondary gear at any time, if one wanted a slower rpm then one would select a lower range ahead of the flywheel, but to maximize torque the objective is to turn as many rpm's at the flywheel as possible, comfortably. This clutching and gearing system allows the flywheel system to be useful in vehicles as well as for numerous other devices such as saws, pumps, etc.

Figure 2:
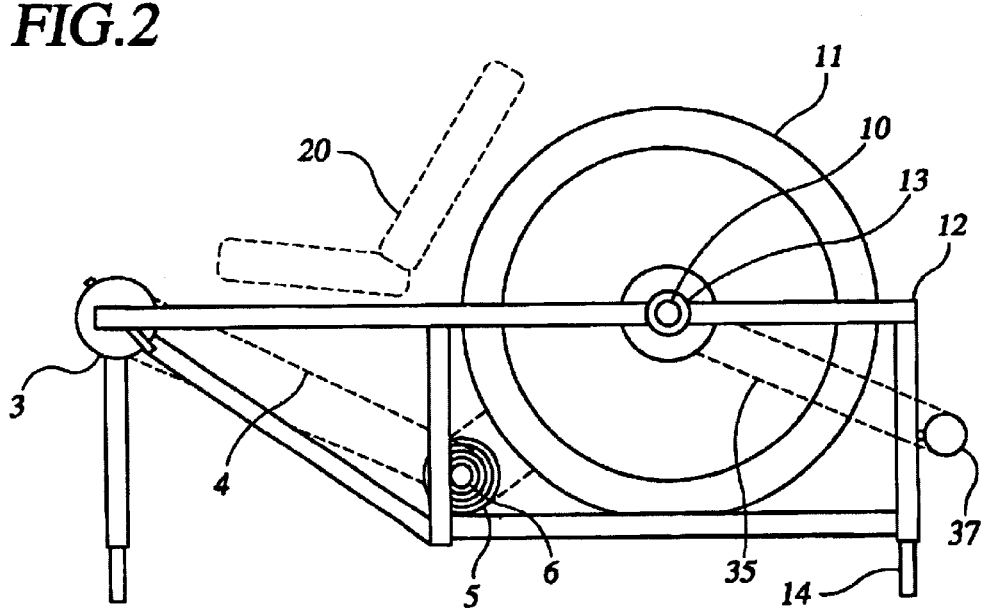
FIG. 2 shows a side view of the removable flywheel power unit of the present invention.

Referring now to FIGS. 1 and 2, a removable flywheel power unit of a human powered device of the present invention is shown. The initial energy is provided by a person pedaling using the pedals 1. The pedals 1 transmit rotational force to a pedal axle 2. In turn the pedal axle 2 turns a set of pedal gears 3 connected to the pedals 1. The rotational force is then transmitted via a first chain 4 to a first set of transfer axle gears 5 that turn a transfer axle 6. The transfer axle turns a second set of transfer gears 7 which transmits the rotational force via a second chain 8. The second chain 8 is connected to a flywheel gear set 9 attached to a flywheel axle 10. The flywheel axle 10 is connected to a flywheel 11 that stores the rotational force.

The pedal axle assembly is preferably selected from off the shelf bicycle components. The transfer axle 6 serves the primary purpose of transferring the rotational force sideways to the edge of the flywheel 11. The first set of transfer gears 5 are also preferably bicycle components and it is contemplated that the pedal gear set 3 and the first set of transfer gears be purchased as readily available sets from off the shelf bicycle components. Specifically, manufacturers such as Suntour, Mavic, Campagnola and Shimano have a variety of components that can be used. Likewise standard shifting components can be used and are available at any local bicycle shop. A typical chain ring combination 3 and 7, the largest set of gears in the front of a bicycle, could be a 48 tooth for the small gear and a 52 or a 54 tooth for the companion gear, however another standard combination could be a 54 tooth gear paired up with a 62 tooth gear. This higher set of gearing is typically used in road racing bicycles. In the case of what are commonly called "mountain bikes" they can typically have a chain ring combination or a close proximity of 22/34/48 because of the climbing they do they prefer lower gearing to maximize the torque required to perform that function.

The rear set of gears 5 and 9 could host a variety of options with a wide selection.

Typically the cassette hub, as its referred to could have a 5 speed gear range of 14/17/21/23/28, and depending on the manufacturer could offer a range starting at 9 teeth and going to 32 teeth with selections of 6–7 or 8 gears available within that range. This is the part that freewheels (disengages) when the rider stops pedaling so that the forward motion is not hindered. Each manufacturer typically designs their own components to fit with a specific compliment of their own brand items so one must be certain when selecting items that they all are compatible, this would include shifting mechanisms, gear selectors, cable, chain and the like.

Similar to a bicycle, the transfer axle 6 should allow the user to stop pedaling and have the first chain 4 stop without forcing the flywheel 11 to stop as well. This may be accomplished by providing a slip bearing at the connection between the flywheel axle 10 and the flywheel gear set 9, although such a connection between the transfer axle gears 5 and the transfer axle 6 would accomplish the same function.

FIG. 1 shows that there are multiple gears along the second transfer gear set 7 and the flywheel gear set 9. It is contemplated that these gear sets would be provided from the same readily available bicycle components described above, but of course single gears are easily attained as well and would reduce cost.

Ultimately, the preferred gearing ratio from the pedal axle 2 to the flywheel axle 10 should be between 10:1 up to about 30:1, but this range will depend upon the size of the flywheel 11 selected for the system. The best modes known at the time of filing have had on average a ratio of 16:1 with a flywheel of 22.5 inches in diameter and 6.5 inches across the face. In the highest gears one can achieve a flywheel rpm of 1550 when set up for one person. The comfortable range was 900–1000 rpm with a cadence of 60 (how many rpm a person spins the pedal gear). Greater ratios could be used with more than one person at a time doing the pedaling, however, the size of the flywheel, will have a significant impact as to how large a ratio you could go. For example: a person could have a ratio of 30:1 and have a cadence of 60 which would yield a flywheel rpm of 1800 with a 2:1 ratio increase would give you a final output of 3600 rpm. The flywheel would naturally have to be about 10–12 inches in diameter or less for one person. A flywheel rule of thumb "when you double the rpm of the flywheel you increase the torque by a factor of four".

The basics of flywheel engineering are well known, the greater the width and circumference, the greater the energy that can be stored. It is generally, desirable to concentrate the weight at the edge of the flywheel, but it must be adequately supported structurally. As shown, the flywheel 11 is rather large and wide allowing it to store significant energy. However, other design considerations can be factored in. For example, the flywheel 11 could be provided by using recycled tires as a good example of an environmental efficient reuse of what would otherwise be waste. To add weight to the outside dimension, the tires could be filled entirely or partially with material. In addition, multiple tires could be attached along a single flywheel axle 10 to increase mass and available torque for use in work. Alternatively, the flywheel 11 could be formed from a circular steel plate with holes drilled near the circumference and outfitted with uniform steel bars.

All of the axles are mounted to the power unit frame 12 by mounting brackets and bearings 13 that allow the axles to spin freely. The mounting brackets and bearings 13 are well known in the art and would be preferentially selected for cost, durability and least amount of friction. Such design considerations are none to those in the art and suitable bearings can be purchased from companies such as "Applied Industrial Technologies" and other reputable business in that field. One suitable example of a bearing could be from the manufacturer "SKF" which has several types available, some of which are, single row deep groove ball bearings, high precision angular contact ball bearings, roller bearings and the like. Other manufacturers that have these and other types available are: Fafnir, Dodge, Sealmaster, Morse and Thompson. In general, these items may be obtained at any place of business that deals with power transmission items.

The chains 4 and 8 are intended to be standard bicycle chain, but this is one of the easier components ordered to any desired length such that the axle and gear placement can be select for best engineering advantage without affecting the cost of the machine significantly.

A seat 20 is shown in dashed lines. While it is contemplated that for pedal powered vehicles a recumbent seat would be the most desirable and have been proven in other contexts to provide the best mechanical advantage, the choice of seating is not critical to the invention. FIG. 1 shows a bench seat 20 that would allow for three prows and therefore three people to pedal. While multiple prows are shown, the power unit could be limited to a single prow.

It may be desirable to provide protective guards (not shown) around the chains. Likewise, protective housings and mudguards (also not shown) might be desirable. For vehicle applications fairings could be added to make the vehicle more aerodynamic. There is a trade-off between providing such additional components and keeping the machine as light as possible. Therefore, it is preferred that these features be incorporated into the various devices themselves and that the flywheel power unit be stripped to its essential elements.

The power unit frame 12 includes three (3) feet 14, two in the rear of the frame and one at the front such that when the feet 14 are placed on a surface, all of the gear sets, axles and flywheel can spin rotationally without interference from the surface. Preferably each of the feet slide up into the inside of the two rear corner posts and have height adjustments for irregular surfaces and are held by a safety type pin or bolt and nut, and can be moved up out of the way. This allows the unit to have at least a three point stance which is adjustable to be very stable on any surface. The two posts behind the flywheel and the one at the front of the prow would be the three stabilizers, adjustable via multiple holes along the uprights whereby a pin and safety key would be removed so that a foot 14 would drop from the center of said post where you would reinsert the pin at the proper height to ensure the device to be level.

Ultimately, the energy stored in the flywheel 11 needs to be released in a controlled manner. Specifically, some form of clutch 30 is needed to engage and disengage power. Further, it is highly desirable to provide multiple gears from the power output to allow varying levels of torque for the same reasons multiple gears are provided in most vehicles.

Figure 3:
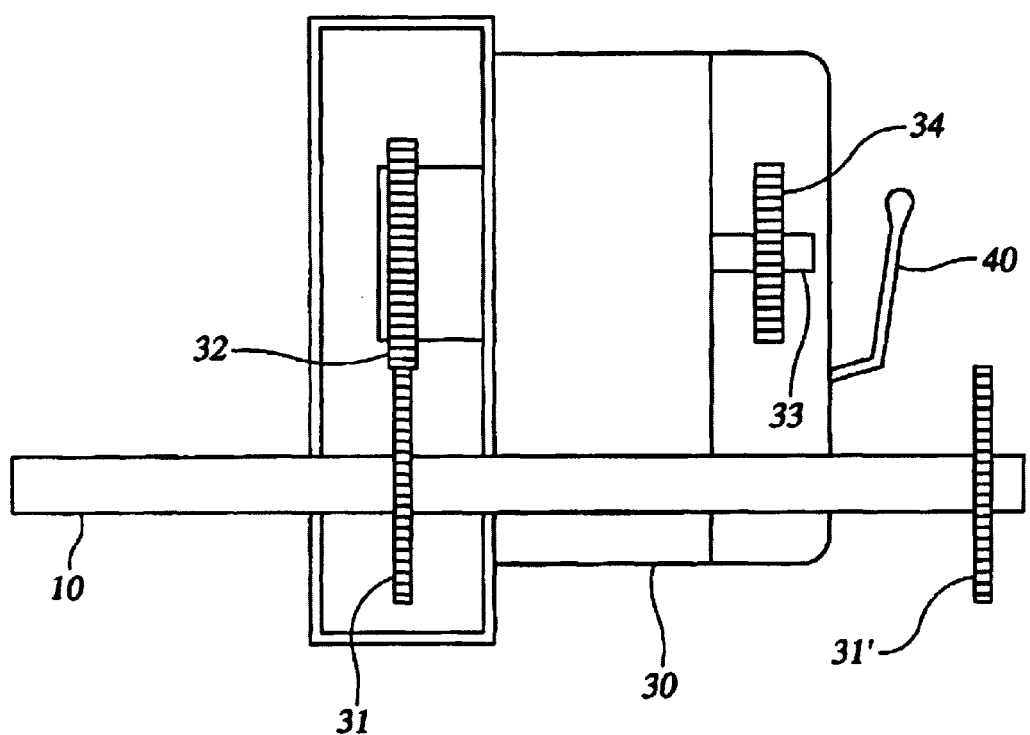
FIG. 3 shows a cross-sectional view of the clutch mechanism for the removable flywheel power unit of the present invention.

Referring now to FIG. 3, the specific transmission connection system is shown. One of the discoveries of the present invention is that a standard motorcycle transmission can be easily modified to provide this essential function. Power to the clutch is provided by a power input gear 31 which is connected to the flywheel axle 10. The power input gear 31 operatively connects to the clutch input gear 32 in approximately a 1:1 ratio. When the clutch with the transmission 30 is engaged, the power is transferred to a power output shaft 33 that includes a power output gear 34. The power output gear 34 is connected to whatever device will be powered via a chain or belt as may be desired.

In all embodiments of the invention at least one transmission 30 will be used. In many cases it will be desirable to divide the power output of the flywheel 11. For example, the power output of a combustion engine for a tractor is most often divided between the propulsion transmission, the PTO and pumps for hydraulic components, which in more modern tractors can be engaged and disengaged independently. Therefore, it is contemplated that multiple transmissions may be employed either in serial fashion or in parallel. However, to keep costs down on the main power unit only one clutch 30 is provided, but the power of the flywheel 11 may be transferred into a second clutch in parallel (i.e. before a clutch) via a second power input gear 31' also connected to the flywheel axle 10.

FIGS. 1 and 2 also show a second power input gear 31' connected via a chain 35 to a PTO axle 36 via a PTO transfer gear 37. The PTO axle 36 includes a PTO output gear 38. Because the primary purpose of this arrangement is just to provide a means to divide the power and allow a secondary connection, the gearing ratio is shown at a 1:1 ratio, but this could be modified.

Figure 4:
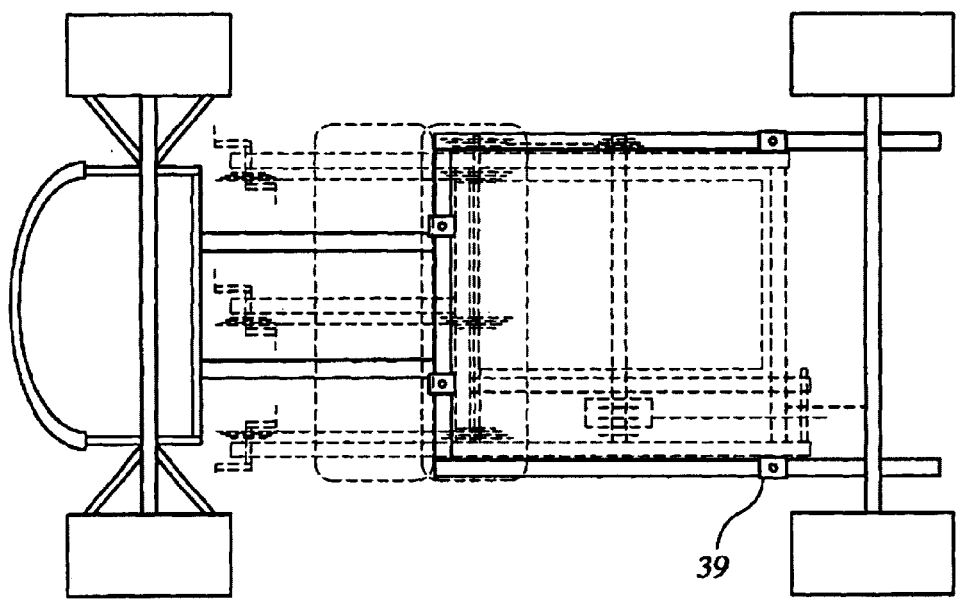
FIG. 4 shows the removable flywheel power unit of the present invention inserted into a wheeled vehicle such that the flywheel supplies power to the wheels.

FIG. 4 shows the removable flywheel power unit of the present invention inserted into a wheeled vehicle such that the flywheel supplies power to the wheels. Support members 39 are provided for connecting the power unit frame 12 to the wheeled vehicle attachment.

Figure 5:
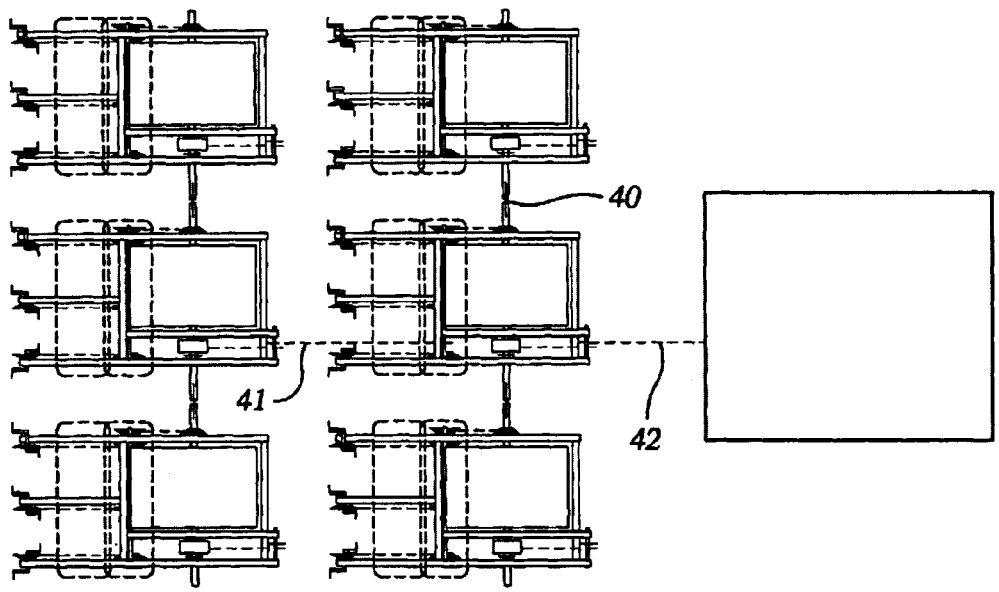
FIG. 5 shows multiple removable flywheel power units of the present invention being used together to power a tool.

FIG. 5 shows multiple removable flywheel power units of the present invention being used together to power a tool. A rod 40 connects the flywheel axles 10 together for each power unit in a line. As an alternative, the pedals 1 or the transfer axles 6 could be connected. Additionally a chain 41 can connect the transfer axle 6 of one row to the PTO output gear 38 to one of the power units in the first row. A chain 42 connects the PTO output gear 38 to one of the power units in the last row to the tool.

In the event that an individual would want to utilize the pedal power unit to power a device outside of the supported footprint, they would unload and level, then attach the device or tool either from the rear with universal mounting hardware and connect the drive chain or belt or shaft and then bring the flywheel up to the required comfortable speed and then begin the work task, OR by utilizing the PTO on the side of the frame and connecting the tool or device directly to the f/w shaft, bypassing the clutching mechanism altogether.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pedal powered flywheel power unit comprising:
   a) a power unit frame;
   b) a flywheel assembly including:
      i) a flywheel axle,
      ii) at least two mounting bearings that secure the flywheel axle to the power unit frame and allow the flywheel axle to rotate freely along its axis,
      iii) at least one flywheel attached to the flywheel axle, and
      iv) a flywheel gear set with at least one gear attached to the flywheel axle;
   c) a transfer axle assembly including:
      i) a transfer axle,
      ii) at least two mounting bearings that secure the transfer axle to the power unit frame and allow the transfer axle to rotate freely along its axis,
      iii) a first transfer gear set with at least one gear attached to one end of the transfer axle, and
      iv) a second transfer gear set with at least one gear attached to the other end of the transfer axle;
   d) a pedal assembly including:
      i) a pedal axle,
      ii) at least one pair of mounting bearings that secures the pedal axle to the power unit frame and allow the pedal axle to rotate freely along its axis,
      iii) two pedals attached to either end of the pedal axle such that a human using the pedals will create rotational force along the pedal axle, and
      iv) a pedal gear set with at least one gear attached to the pedal axle;
   e) a first chain operatively connecting the pedal gear set to the first transfer gear set;
   f) a second chain operatively connecting the second transfer gear set to the flywheel gear set; and
   g) a first transmission assembly including:
      i) a transmission transfer gear attached to the flywheel axle,
      ii) a transmission with multiple gears in a gearing ratio of 10:1 to 0.8:1,
      iii) a transmission input gear attached to the transmission and operatively associated with the transmission transfer gear in approximately a 1:1 gearing ratio,
      iv) a transmission output gear attached to the transmission that provides power output from the flywheel only when a clutch within the transmission in engaged.

2. The pedal powered flywheel power unit of claim 1 further comprising a third transfer gear set with at least one gear attached to the transfer axle and a second pedal assembly including:
   i) a second pedal axle,
   ii) at least one pair of mounting bearings that secures the second pedal axle to the power unit frame and allow the second pedal axle to rotate freely along its axis,
   iii) two pedals attached to either end of the second pedal axle such that a human using the pedals will create rotational force along the second pedal axle,
   iv) a second pedal gear set with at least one gear attached to the second pedal axle, and
   v) a third chain operatively connecting the second pedal gear set to the third transfer gear set.

3. The pedal powered flywheel power unit of claim 1 further comprising a rod that inserts into the flywheel axle and can connect to a flywheel axle of a second pedal powered flywheel power unit of claim 1 such that the two pedal powered flywheel power units operate in unison.

4. The pedal powered flywheel power unit of claim 1 further comprising a rod that inserts into the transfer axle and can connect to a transfer axle of a second pedal powered flywheel power unit of claim 1 such that the two pedal powered flywheel power unit operate in unison.

5. The pedal powered flywheel power unit of claim 1 further comprising support members located on the power unit frame for connecting to a wheeled vehicle support frame.

6. The pedal powered flywheel power unit of claim 5 further comprising a wheeled vehicle support frame that supports two axles with two wheels each wherein one set of the wheels and axles is operatively connected to a steering mechanism and one axle is operative connected to the transmission output gear.

7. The pedal powered flywheel power unit of claim 1 further comprising a third gear set on the transfer axles that can be connected by a chain to a second pedal powered flywheel power unit of claim 1 such that the two pedal powered flywheel power units operate in unison.

* * * * *